United States Patent [19]

Mordick

[11] Patent Number: 5,683,005
[45] Date of Patent: Nov. 4, 1997

[54] ADJUSTABLE MOUNTING SYSTEM

[75] Inventor: Brian L. Mordick, Shoreview, Minn.

[73] Assignee: Federal-Hoffman, Inc., Anoka, Minn.

[21] Appl. No.: 608,844

[22] Filed: Feb. 27, 1996

[51] Int. Cl.$^6$ ..................................................... H02G 3/08
[52] U.S. Cl. ............................ 220/3.7; 220/3.8; 248/27.3
[58] Field of Search .............................. 220/3.7, 3.2, 3.9, 220/4.02; 248/27.3; 361/426

[56] References Cited

U.S. PATENT DOCUMENTS

| | | | |
|---|---|---|---|
| 3,231,903 | 2/1966 | Cope | 220/3.6 |
| 4,209,154 | 6/1980 | Hehl | 220/3.6 |
| 4,223,796 | 9/1980 | Silver | 220/3.7 |
| 4,496,067 | 1/1985 | Benscoter | 220/3.7 |
| 4,541,036 | 9/1985 | Landrigs et al. | 220/3.6 |
| 4,699,289 | 10/1987 | You | 220/3.7 |

OTHER PUBLICATIONS

Hoffman Engineering Company Specifier's Guide, 1995–1996, pp. 199, 237–238, 240–249, 265–267, 400–405, 418–421, 428–429, 530–531, showing enclosures.

*Primary Examiner*—Joseph M. Moy
*Attorney, Agent, or Firm*—Merchant, Gould, Smith, Edell, Welter & Schmidt

[57] ABSTRACT

Apparatus is provided for mounting components in enclosures such as electrical junction boxes and the like. The apparatus includes a bracket, which is attached to a surface of the enclosure, and a mounting element, which is attached to the bracket. The bracket can be mounted in one of two preferred orientations, each orientation affording a different mounting height for the mounting element. The mounting element may be attached to the upper or lower surface of the bracket in either of its preferred orientations, or may be clamped between the bracket and the surface of the enclosure. Flexible arrangement of the components within the enclosure is possible through the selection of a preferred bracket orientation and a preferred mounting position for the mounting element.

29 Claims, 4 Drawing Sheets

ADJUSTABLE MOUNTING SYSTEM

BACKGROUND OF THE INVENTION

1. Field of the Invention

The present invention relates generally to a mechanical mounting system, and particularly to a mounting system which provides adjustable mounting positions for components.

2. Description of Related Art

Electrical distribution systems require the use of a number of components, such as fuses, circuit breakers, switches, terminals and junctions, in addition to electrical conduits for carrying the conducting wires. The components are typically mounted in an enclosure, such as a fuse box or junction box, for reasons of safety. The prior art enclosures were commonly a metal box which was electrically grounded, inside of which was mounted a flat, blank panel. The panel was mounted in a raised position so that there existed a space between the panel and the back surface of the enclosure. The procedure for mounting a component was typically to place the component against the panel for fitting and then to drill a set of holes, which matched the mounting hole pattern of the component, in the panel. The component was then attached to the panel using a conventional fastener, such as a clip, bolt, screw, rivet or nail. This method of mounting therefore required that the component's position be set carefully to be correct in order to avoid the time-consuming process of removing the component and drilling a second set of holes in order to effect an adjustment in the component's position.

It would be advantageous to provide a method of mounting components in an enclosure where the position of the component can be adjusted without having to remove the component and drill new holes. This lack of adjustability is overcome, at least in part, by the use of a mounting rail instead of a panel. Rail mounting systems are available, but they lack the ability to provide panel mounting concurrently with rail mounting. In addition, rail mounting systems offer little flexibility in the choice of available mounting positions, as discussed hereinbelow.

Certain components require adjustment or maintenance after being mounted in an enclosure, either on a panel or a rail, and it is often the case that the adjustment or maintenance on the component is to be made on a side surface rather than an outwardly facing surface. Access to the point of adjustment or maintenance may be blocked by the enclosure walls or by another component present in the enclosure, thus making the adjustment or maintenance step difficult, and may even require removing one or more of the components to accomplish the adjustment or maintenance. In such situations, it would be advantageous to be able to mount each component in such a position within the enclosure that the accessibility of that component is improved. For instance, a small, shallow component could be mounted at a position approximately level with the outward surface of a large, deep component, so that both components are made equally accessible. Further, the use of a mounting panel or a rail provides only one surface upon which components may be mounted. Consequently, the use of panels or current rail mounting schemes restricts the ability to mount the components in layers or at different levels within the enclosure. The use of panels or rails does not currently admit the ability to interleave layers of components. Interleaving may be an advantageous technique to employ in cases where a number of components are to be mounted in the enclosure of limited space.

There therefore exists a need for an enclosure where components can be mounted on either a panel or a rail and where components may be mounted at different levels, thereby providing a possible increase in the capacity of the enclosure. In addition, there exists a need for a mounting system which provides for easy adjustment of the position of a component within an enclosure after the component has been mounted which also provides flexibility in the arrangement of the components within the enclosure, for example in allowing the distance from the component to the back surface to be adjusted, in order to improve the access to that component.

The present invention addresses these as well as other problems associated with mounting systems.

SUMMARY OF THE INVENTION

Apparatus is provided for mounting components in enclosures such as electrical junction boxes and the like. The apparatus includes a bracket, which is attached to a surface of the enclosure, and a mounting element, which is attached to the bracket. The bracket can be mounted in one of two preferred orientations, each orientation affording a different mounting height for the mounting element. The mounting element may be attached to the upper or lower surface of the bracket in either of its preferred orientations, or may be clamped between the bracket and the surface of the enclosure. Flexible arrangement of the components within the enclosure is possible through the selection of a preferred bracket orientation and a preferred mounting position for the mounting element.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

The accompanying drawings, which are incorporated in and form part of the specification, illustrate embodiments of the present invention and, together with the description, serve to explain the principles of the invention. In the drawings, wherein like reference numerals and letters generally indicate corresponding parts throughout the several views.

DETAILED DESCRIPTION OF THE EMBODIMENT

Figure 1:
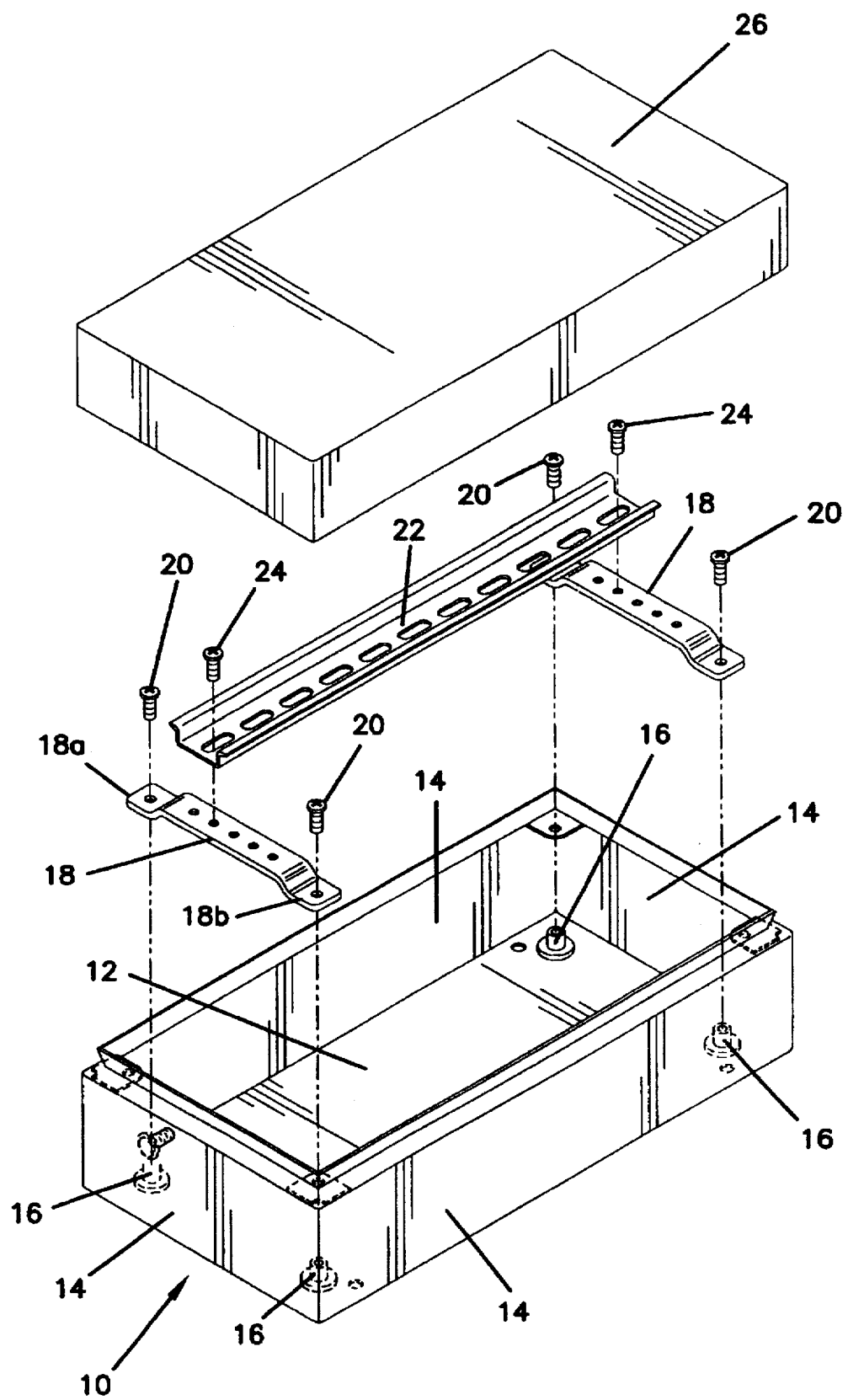
FIG. 1 shows an exploded perspective view of an enclosure incorporating a mounting rail attached to a bracket according to the principles of the present invention.

Referring now to the figures and, more particularly, to FIG. 1, there is illustrated a preferred embodiment of an adjustable mounting system for an enclosure. FIG. 1 shows an exploded perspective view of an enclosure 10 having a base surface 12 on the bottom and side walls 14 extending from the base surface 12 to form an enclosed volume. The base surface 12 includes a plurality of raised fastening devices 16 to which a bracket 18 is fastened. The raised fastening devices 16 are adapted to fixedly hold the bracket 18 in a position separated from the base surface 12 by a predetermined distance. The raised fastening devices 16 are preferably metal studs welded to the base surface 12, with a threaded inner surface therein for receiving a fastening screw 20 to fasten the bracket 18 to the device 16. It is understood that the raised fastening device 16 could alternatively be of another form, such as a stud with a clip for clipping the bracket 18 in position.

The bracket 18 has a centrally located mounting portion which includes a plurality of mounting holes and has fastening portions 18a and 18b disposed at the ends. The fastening portions each include a hole for receiving one of the fastening screws 20 therethrough. The mounting portion is offset from the fastening portions 18a and 18b of the bracket 18. As a result of the offset, the distance separating the base surface 12 from the fastening portions 18a and 18b of the bracket 18 is different from the distance separating the base surface 12 and the mounting portion of the bracket 18 when the bracket 18 is fastened to the raised fastening device 16.

A rail 22, such as a DIN standard rail, is secured to the bracket 18, by a securing screw 24. It is understood that other securing devices, such as a clip, bolt, screw, rivet or nail or the like, may be used for securing the rail 22 to the bracket 18. Electrical components, such as fuses, circuit breakers, switches, terminals and junctions, may be mounted to the rail 22 in a manner which allows the component to be adjustably positioned. The distance between the rail 22 and the back surface 12 can be adjusted by choosing preferred mounting positions for the bracket 18 and the rail 22 as is discussed hereinbelow. A cover 26 fits over the enclosure 10 to seal the mounted component inside the enclosure and prevent incidental access or the ingress of water, dust or the like. The cover 26 is attachable to the enclosure in a number of ways, such as being hingably attached to the enclosure 10 with a lock for maintaining the cover 26 closed, or being held in place on the enclosure 10 with a plurality of clips.

Figure 2:
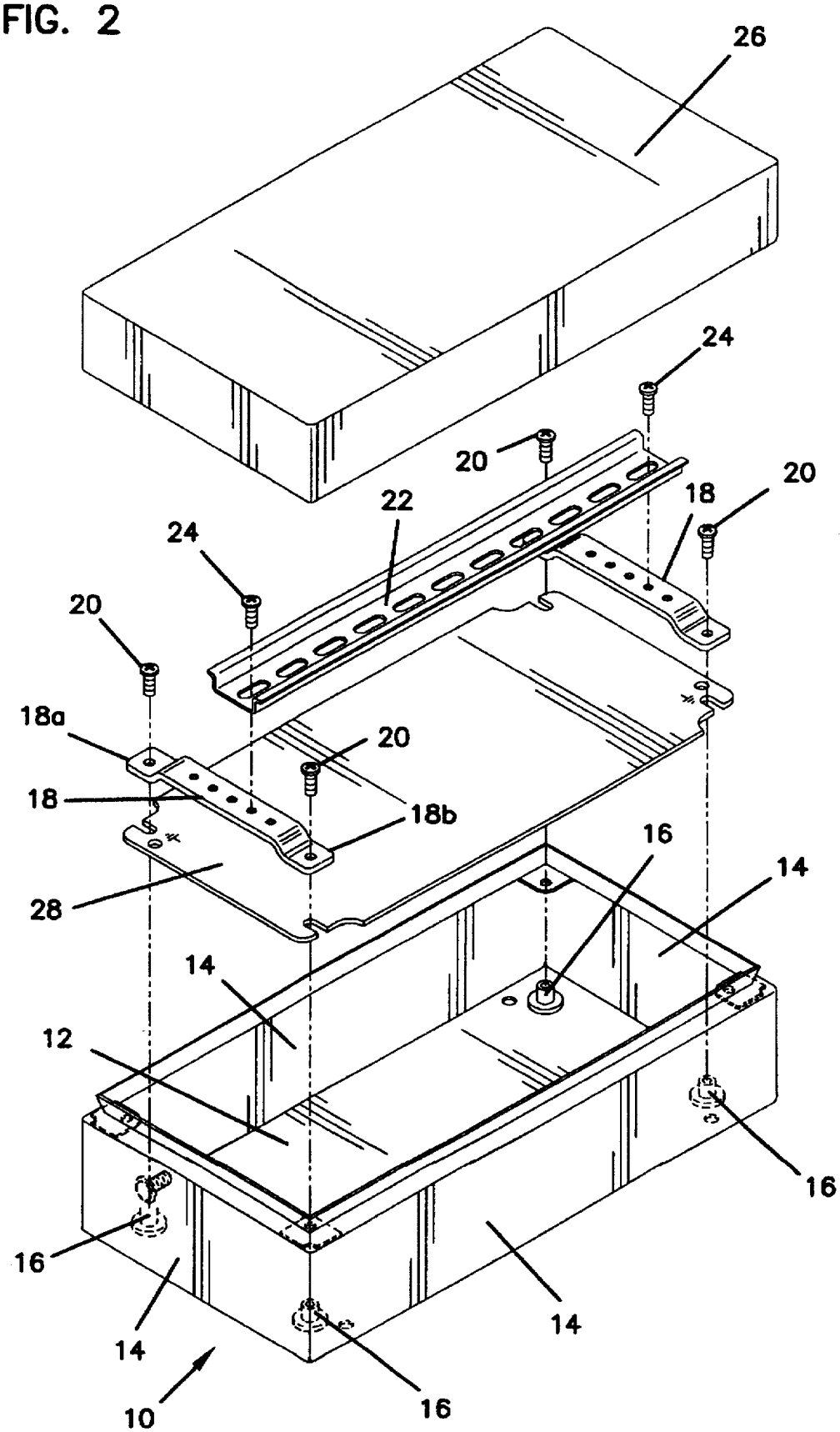
FIG. 2 shows an exploded perspective view of the enclosure shown in FIG. 1 incorporating a mounting rail and a mounting panel attached to a bracket.

In FIG. 2 is illustrated an alternative embodiment of the present invention, where a mounting panel 28 has been included in the enclosure 10. The mounting panel 28 is positioned between the bracket 18 and the back surface 12 and is secured in place by the fastening screws 20. A component can be mounted on the mounting panel 28 in the conventional manner of drilling mounting holes in the mounting panel 28 and fastening the component to the mounting panel 28 using a fastening device, such as a clip, bolt, screw, rivet or nail. Alternatively, the mounting panel can be secured in different locations on the bracket 18, as is discussed hereinbelow.

Figure 3:
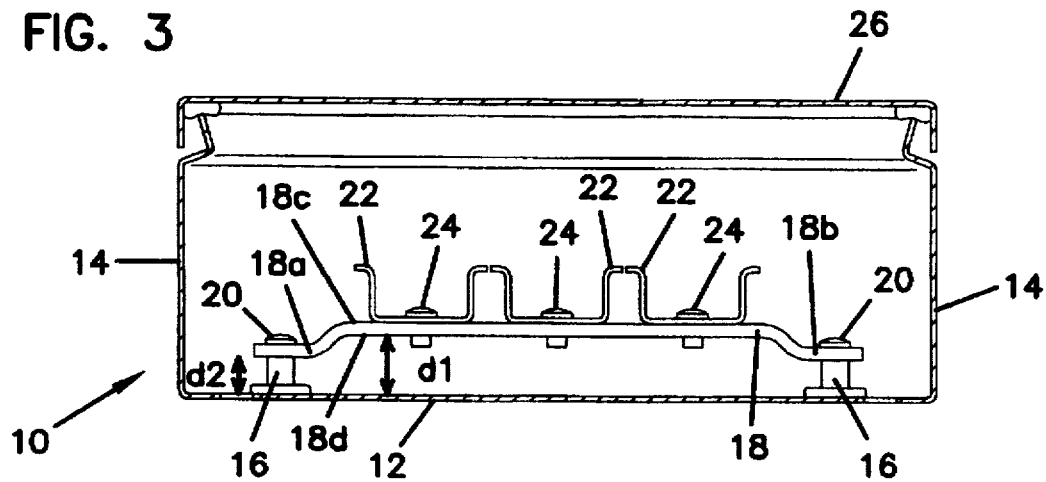
FIG. 3 shows an end sectional view through the enclosure shown in FIG. 1, with a bracket and mounting rail in a first mounting position.

As shown in FIG. 3, the bracket 18 is mountable in a first position, where the distance, d1, separating the central mounting portion of the bracket 18 and the base surface 12, is larger than the distance, d2, separating the fastening portions 18a and 18b of the bracket 18 and the base surface 12. The central mounting portion has two faces, denoted 18c and 18d. In the orientation shown in FIG. 3, surface 18d is closer to the base surface 12 than surface 18c. The bracket 18 is illustrated to have three rails 22 secured by securing screws 24 to surface 18c. However, other numbers of rails may be mounted in various orientations and positions, as explained hereinafter. With the rails 22 in the first mounting position, the distance separating the rails 22 and the base surface 12 is relatively large.

Figure 4:
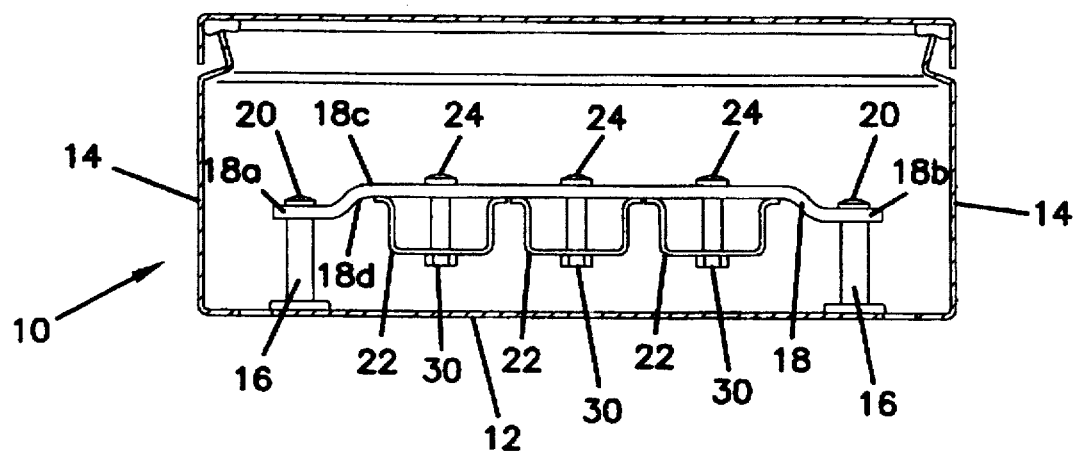
FIG. 4 shows an end sectional view through the enclosure shown in FIG. 1, with a bracket and mounting rail in a second mounting position.

A second mounting position for the rails 22 is illustrated in FIG. 4, with the bracket 18 in the same orientation as shown in the FIG. 3. In the second mounting position, the rails 22 are secured to surface 18d of the bracket 18, using securing screws 24 and securing nuts 30, or other retaining devices, so that the rails 22 lie intermediate the bracket 18 and the base surface 12. With the rails 22 in the second mounting position, the distance separating the rails 22 and the base surface 12 is smaller than that in the first mounting position.

Figure 5:
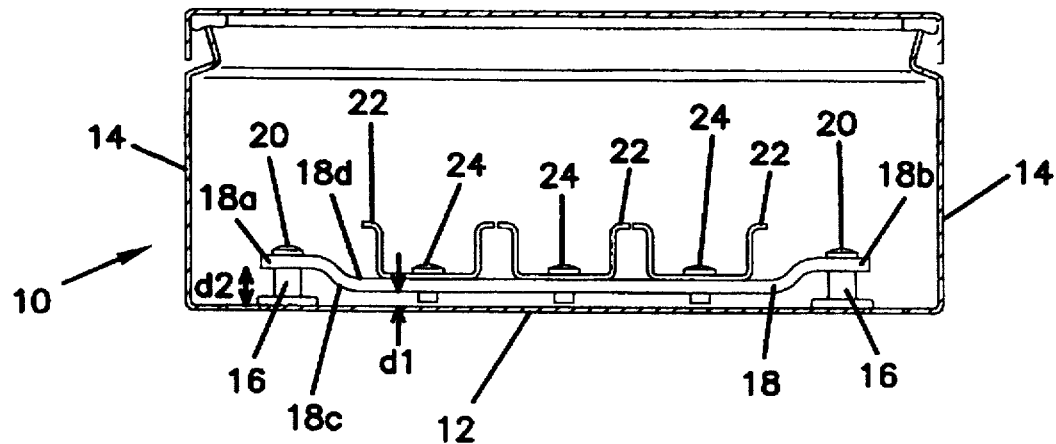
FIG. 5 shows an end sectional view through the enclosure shown in FIG. 1, with a bracket and mounting rail in a third mounting position.

A third mounting position for the rails 22 is illustrated in FIG. 5. The bracket 18 is shown to be in a second, inverted position, where the distance, d1, separating the mounting portion of the bracket 18 and the base surface 12, is smaller than the distance, d2, separating the fastening portions 18a and 18b of the bracket 18 and the base surface 12. In the third mounting position, the rails 22 are secured by securing screws 24 to surface 18d of the bracket 18. With the rails 22 in the third mounting position, the distance separating the rails 22 and the base surface 12 is smaller than that in the first mounting position shown in FIG. 3.

Figure 6:
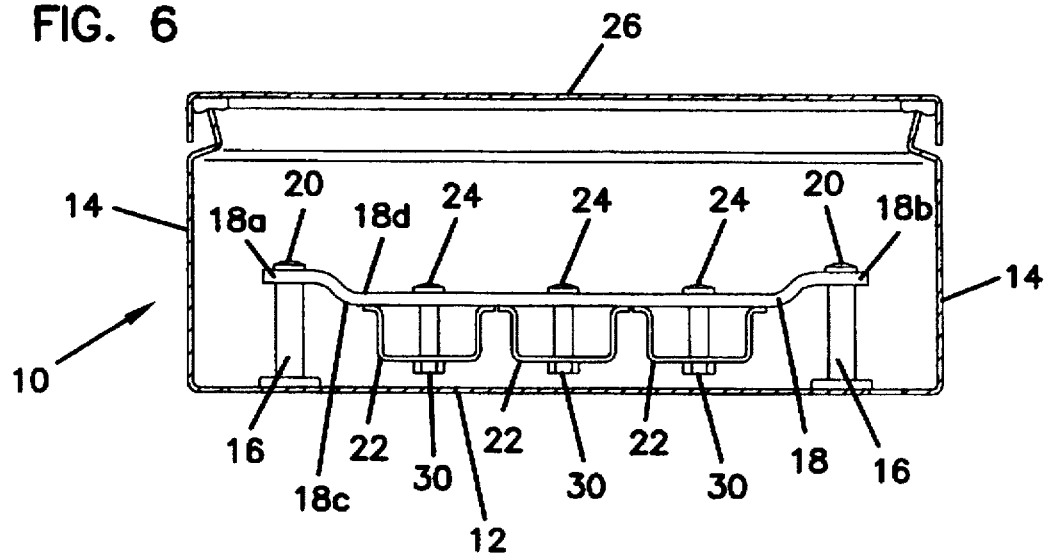
FIG. 6 shows an end sectional view through the enclosure shown in FIG. 1, with a bracket and mounting rail in a fourth mounting position.

A fourth mounting position for the rails 22 is illustrated in FIG. 6, with the bracket 18 in the second, inverted orientation, as also shown in FIG. 5. In the fourth mounting position, the rails 22 are secured to the bracket 18, using securing screws 24 and securing nuts 30, or other securing devices, so that the rails 22 lie intermediate the bracket 18 and the base surface 12, and are attached to surface 18c. With the rails 22 in this fourth mounting position, the distance separating the rails 22 and the base surface 12 is smaller than that in the third mounting position.

Figure 7:
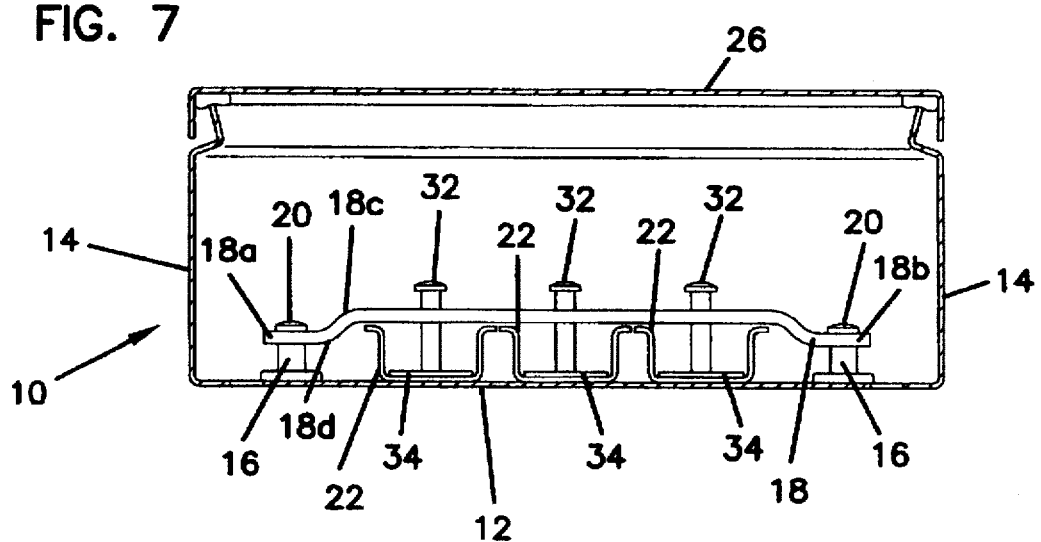
FIG. 7 shows an end sectional view through the enclosure shown in FIG. 1, with a bracket and mounting rail in a fifth mounting position; and, FIG. 8 shows an end sectional view through the enclosure shown in FIG. 1, showing a bracket, a mounting rail and a mounting panel.

A fifth mounting position for the rails 22 is illustrated in FIG. 7, with the bracket 18 in the first orientation, as also shown in FIG. 3. In the fifth position, the rails 22 are clamped to the base surface 12 by clamping plates 34 held against the rails 22 by clamping screws 32 which are screwed through the bracket 18. With the rails 22 in this fifth mounting position, the distance separating the rails 22 and the base surface 12 is reduced to a minimum.

Figure 8:
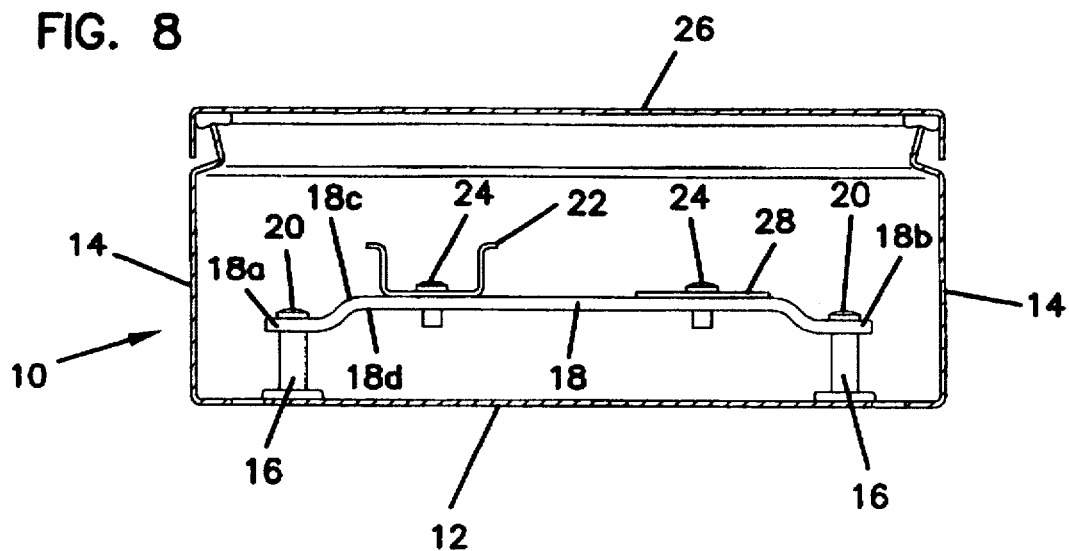

An alternative embodiment of the invention which includes a rail 22 and a mounting panel 28 is illustrated in FIG. 8. The mounting panel 28 has a width less than that of the mounting panel 28 illustrated in FIG. 2. The bracket 18 is shown in the first orientation. A rail 22 is secured to surface 18c of the bracket 18. The mounting panel 28, extending for approximately half the width of the mounting portion of the bracket 18, is secured to the bracket 18 using a securing screw 24. This embodiment allows the user to mount a component on either a panel or a rail. It is to be understood that the mounting panel 28 can be secured to the bracket 18 in its first orientation or second, inverted orientation, and that the mounting panel 28 may also be secured to either surface 18c or 18d of the bracket 18, in a manner illustrated for the rail 22 in FIGS. 3–6. It can be appreciated that the present invention provides for mounting various combinations of rails 22 and panels 28 in a number of orientations and positions in order to adapt to specific mounting needs.

The present invention provides a flexible system for mounting components at specified heights within an enclosure. By choosing a preferred bracket orientation and mounting position for a rail or panel, components may be mounted in a position which allows for improved accessibility for adjustment or maintenance. Additionally, the ability to mount components at different heights may allow components to be mounted in layers and thus increase the capacity of the enclosure.

It will, of course, be understood that various modifications and additions can be made to the preferred embodiments discussed hereinabove without departing from the scope or spirit of the present invention. Accordingly, the scope of the present invention should not be limited by the particular embodiments listed above, but should be defined only by the claims set forth below and equivalents of the disclosed embodiments.

What is claimed is:

1. An adjustable mounting system, comprising:
   a base surface having raised fastening means;
   a bracket having a mounting portion and a fastening portion for attaching to the raised fastening means, wherein the fastening portion is offset from the mounting portion and the bracket is mountable in a first orientation or a second, inverted orientation.

2. The adjustable mounting system of claim 1, further comprising:
   a mounting element;
   securing means, connected to the bracket for securing the mounting element at a plurality of distances from the underlying surface.

3. The adjustable mounting system of claim 1, further comprising:
   a mounting element;
   securing means, connected to the bracket for securing the mounting element;
   wherein a distance separating the mounting element and the base surface is variable.

4. The adjustable mounting system of claim 2, wherein, in the first orientation, the mounting element is securable so that the bracket is positioned intermediate the mounting element and the base surface.

5. The adjustable mounting system of claim 2, wherein, in the second, inverted orientation, the mounting element is securable so that the bracket is positioned intermediate the mounting element and the base surface.

6. The adjustable mounting system of claim 2, wherein, in the first orientation, the mounting element is securable so that the mounting element is positioned intermediate the bracket and the base surface.

7. The adjustable mounting system of claim 2, wherein, in the second, inverted orientation, the mounting element is securable so that the mounting element is positioned intermediate the bracket and the base surface.

8. The adjustable mounting system of claim 2 wherein, in either the first orientation or the second, inverted orientation, the mounting element is securable so that either the mounting element is positioned intermediate the bracket and the base surface or the bracket is positioned intermediate the mounting element and the base surface.

9. The adjustable mounting system of claim 2, wherein the mounting element is fixedly securable to the bracket by the securing means.

10. The adjustable mounting system of claim 2, wherein the mounting element comprises a panel.

11. The adjustable mounting system of claim 2, wherein the mounting element comprises a rail.

12. The adjustable mounting system of claim 11, wherein the rail has raised edge portions and a center portion having a mounting aperture formed therein.

13. An enclosure, comprising:
    an enclosure housing having an inside base surface, the surface having raised fastening means;
    means for fastening components to the enclosure housing, comprising:
    a bracket having a mounting portion and fastening portion for attaching to the raised fastening means, wherein the fastening portion is offset from the mounting portion and the bracket is mountable in a first orientation or a second, inverted orientation;
    a mounting element;
    securing means connected to the bracket for securing the mounting element at a plurality of distances from the base surface.

14. The enclosure of claim 13, wherein, in the first orientation, the mounting element is securable so that the bracket is positioned intermediate the mounting element and the base surface.

15. The enclosure of claim 13, wherein, in the second, inverted orientation, the mounting element is securable so that the bracket is positioned intermediate the mounting element and the base surface.

16. The enclosure of claim 13, wherein, in the first orientation, the mounting element is securable so that the mounting element is positioned intermediate the bracket and the base surface.

17. The enclosure of claim 13, wherein, in the second, inverted orientation, the mounting element is securable so that the mounting element is positioned intermediate the bracket and the base surface.

18. The enclosure of claim 13, wherein, in either the first orientation or the second, inverted orientation, the mounting element is securable so that either the mounting element is positioned intermediate the bracket and the base surface or the bracket is positioned intermediate the mounting element and the base surface.

19. The enclosure of claim 13, wherein the mounting element is fixedly secured to the bracket by the securing means.

20. The enclosure of claim 13, wherein the mounting element comprises a panel.

21. The enclosure of claim 13, wherein the mounting element comprises a rail.

22. The enclosure of claim 21, wherein the rail has raised edge portions and a center portion having a mounting aperture formed therein.

23. An adjustable mounting system, comprising:
    a base surface having raised fastening means;
    a bracket having a mounting portion and a fastening portion for attaching to the raised fastening means, wherein the fastening portion is offset from the mounting portion and the bracket is mountable in a first orientation and a second, inverted orientation;
    a mounting rail;
    securing means, connected to the bracket for securing the mounting rail at a plurality of distances from the underlying surface.

24. The adjustable mounting system of claim 23, wherein, in either the first orientation or the second, inverted orientation, the mounting rail is securable so that either the mounting rail is positioned intermediate the bracket and the base surface or the bracket is positioned intermediate the mounting rail and the base surface.

25. The adjustable mounting system of claim 23, wherein the rail has raised edge portions and a center portion having a mounting aperture formed therein.

26. An adjustable mounting system, comprising:

a base surface having raised fastening means;

a bracket having a mounting portion and a fastening portion for attaching to the raised fastening means, wherein the fastening portion is offset from the mounting portion and the bracket is mountable in a first orientation and a second, inverted orientation;

securing means, connected to the bracket;

a mounting rail secured to the bracket; and a mounting panel secured to the bracket;

wherein the mounting rail and the mounting panel are securable at a plurality of distances from the underlying surface.

27. The adjustable mounting system of claim 26, wherein, in either the first orientation or the second, inverted orientation, the mounting rail is securable so that either the mounting rail is positioned intermediate the bracket and the base surface or the bracket is positioned intermediate the mounting rail and the base surface.

28. The adjustable mounting system of claim 26, wherein, in either the first orientation or the second, inverted orientation, the mounting panel is securable so that either the mounting rail is positioned intermediate the bracket and the base surface or the bracket is positioned intermediate the mounting panel and the base surface.

29. The adjustable mounting system of claim 26, wherein the mounting rail has raised edge portions and a center portion having a mounting aperture formed therein.

* * * * *